(12) United States Patent
Pauly

(10) Patent No.: US 7,338,011 B2
(45) Date of Patent: Mar. 4, 2008

(54) METHOD MAKING IT POSSIBLE TO PREVENT VIBRATION OF A RUDDER OF AN AIRCRAFT AND AIRCRAFT USING THIS METHOD

(75) Inventor: Bernard Pauly, Blagnac (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/996,454

(22) Filed: Nov. 26, 2004

(65) Prior Publication Data

US 2005/0116094 A1 Jun. 2, 2005

(30) Foreign Application Priority Data

Nov. 27, 2003 (FR) .................................. 03 13912

(51) Int. Cl.
*B64C 9/00* (2006.01)
(52) U.S. Cl. ..................................... 244/99.14; 244/91
(58) Field of Classification Search ............... 244/3.24, 244/198, 199.1, 199.2–199.4, 200, 88, 91, 244/99.13, 99.14
See application file for complete search history.

(56) References Cited

U.S. PATENT DOCUMENTS

| | | | | |
|---|---|---|---|---|
| 1,439,463 A | * | 12/1922 | Zaparka | 74/497 |
| 1,457,507 A | | 6/1923 | Delage | |
| 1,886,143 A | * | 11/1932 | Zaparka | 403/224 |
| 1,893,064 A | * | 1/1933 | Zaparka | 244/198 |
| 1,893,065 A | * | 1/1933 | Zaparka | 244/215 |
| RE19,412 E | * | 1/1935 | Stoner | 244/215 |
| 2,253,025 A | * | 8/1941 | Fedden et al. | 165/69 |
| 2,373,236 A | * | 4/1945 | Effinger, Jr. | 244/3 |
| 2,492,252 A | * | 12/1949 | Wing | 244/78.1 |
| 2,516,406 A | * | 7/1950 | Moyer | 244/216 |
| 2,556,351 A | * | 6/1951 | Tulley | 244/99.13 |
| 2,797,882 A | * | 7/1957 | Servanty | 244/76 R |
| 2,852,210 A | * | 9/1958 | Dietrich | 244/215 |
| 2,934,291 A | * | 4/1960 | Hamilton | 244/82 |
| 2,996,267 A | * | 8/1961 | Warren | 244/3.21 |

(Continued)

OTHER PUBLICATIONS

"Trim", www.answers.com, p. 1-2.*

(Continued)

*Primary Examiner*—Timothy D. Collins
(74) *Attorney, Agent, or Firm*—Stevens, Davis, Miller & Mosher, LLP

(57) ABSTRACT

A method for preventing vibration of a rudder of an aircraft may have, on a lateral aerodynamic surface of the aircraft's rudder, a protruding aerodynamic element capable of generating an aerodynamic effect tending to rotate the rudder about its articulation axis. An actuator of the rudder is controlled such that it counters the action of the protruding aerodynamic element and such that it imposes on the rudder a position of equilibrium in aerodynamic extension of the fixed vertical stabilizer.

6 Claims, 2 Drawing Sheets

U.S. PATENT DOCUMENTS

| | | | | |
|---|---|---|---|---|
| 3,018,071 | A * | 1/1962 | Horton et al. | 244/178 |
| 3,047,253 | A * | 7/1962 | Grimes | 244/35 R |
| 3,202,383 | A * | 8/1965 | Le Bel et al. | 244/209 |
| 3,568,618 | A * | 3/1971 | Bedford, Jr. | 114/285 |
| 3,734,432 | A * | 5/1973 | Low | 244/191 |
| 4,560,304 | A * | 12/1985 | Jenkins et al. | 405/74 |
| 4,708,305 | A * | 11/1987 | Kelley et al. | 244/17.19 |
| 4,884,748 | A * | 12/1989 | Ward et al. | 239/265.37 |
| 5,058,837 | A * | 10/1991 | Wheeler | 244/200.1 |
| 5,076,516 | A * | 12/1991 | Wheat et al. | 244/154 |
| 5,088,665 | A * | 2/1992 | Vijgen et al. | 244/200 |
| 5,294,080 | A * | 3/1994 | Ross | 244/215 |
| 5,375,794 | A * | 12/1994 | Bleeg | 244/76 C |
| 5,385,110 | A * | 1/1995 | Bennett et al. | 114/285 |
| 5,492,448 | A * | 2/1996 | Perry et al. | 416/62 |
| 5,549,260 | A * | 8/1996 | Reed, III | 244/195 |
| 5,946,981 | A * | 9/1999 | Ide et al. | 74/579 R |
| 6,015,115 | A * | 1/2000 | Dorsett et al. | 244/219 |
| 6,070,545 | A * | 6/2000 | Keenan | 114/102.13 |
| 6,322,324 | B1 * | 11/2001 | Kennedy et al. | 416/1 |
| 6,375,127 | B1 * | 4/2002 | Appa | 244/215 |
| 6,467,422 | B1 * | 10/2002 | Elms | 114/274 |
| 6,493,689 | B2 * | 12/2002 | Kotoulas et al. | 706/23 |
| 6,641,089 | B2 * | 11/2003 | Schwetzler et al. | 244/198 |
| 6,751,602 | B2 * | 6/2004 | Kotoulas et al. | 706/23 |
| 6,863,245 | B2 * | 3/2005 | Gessler et al. | 244/215 |
| 7,028,954 | B2 * | 4/2006 | Van Dam et al. | 244/204 |
| 2003/0099546 | A1 * | 5/2003 | Stiesdal et al. | 416/228 |
| 2003/0102410 | A1 * | 6/2003 | Gessler et al. | 244/215 |
| 2003/0218102 | A1 * | 11/2003 | Van Dam et al. | 244/215 |
| 2004/0030664 | A1 * | 2/2004 | Kotoulas et al. | 706/22 |
| 2004/0253108 | A1 * | 12/2004 | Schmaling et al. | 416/132 A |
| 2005/0238482 | A1 * | 10/2005 | Loftus et al. | 415/148 |

OTHER PUBLICATIONS

Hak-Tae Lee, AIAA2004-2693 "Computational Investigation of Wings with Miniature Trailing Edge Control Surfaces", 2nd AIAA Flow Control Conference Jun. 28-Jul. 1, 2004/Portland, OR.* www.aviationtoday.com, Mar. 1, 2000, "Aerodyanmics by R. W. Prouty", pp. 1-3.* www.allamericanracers.com, "Gurney Flap", pp. 1-4, Sep. 2000.*

Gurney flap. Wikipedia, The Free Encyclopedia. Apr. 12, 2006, 02:14 UTC. May 10, 2006, 22:06 <http://en.wikipedia.org/w/index.php?title=Gurney_flap&oldid=48055648>.*

"Dan Gurney." Wikipedia, The Free Encyclopedia. Apr. 27, 2006, 03:37 UTC. May 10, 2006, 22:07 <http://en.wikipedia.org/w/index.php?title=Dan_Gurney&oldid=50368152>.* www.aviationtoday.com, Feb. 1, 2000 "Aviation Today", "Aerodyanmics by R. W. Prouty", pp. 1-3.*

LoDolce, Tim. "The Gurney Flap." The Grapevine XXIV.No. 6Jun. 2004 1-6. May 10, 2006 <www.eaa663.org/Newsletter/PDF/2001/EAA%202001-8.pdf>.* www.insiderracingtechnology.com, p. 1-3. Jul. 14, 2000.*

Hak-tae Lee AIAA 2002-1717 "Flutter Suppression for HIgh Aspect Ratio Flexible Wings Using Microflaps", 43rd AIAA/ASMEA/ASCE/AHS/ASC Structures, Structural Dynamics, and Material Conference, Apr. 22-25, 2002, Denver Colorado.*

Preliminary Search Report dated Jun. 25, 2004.

* cited by examiner

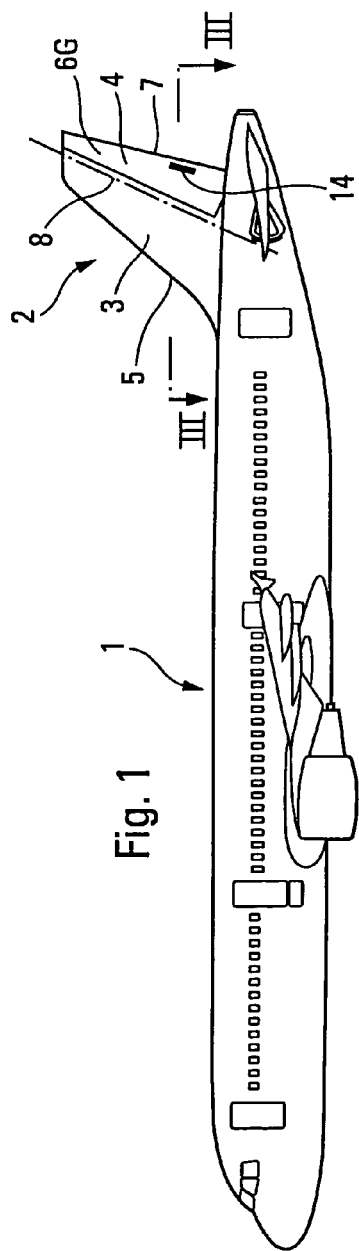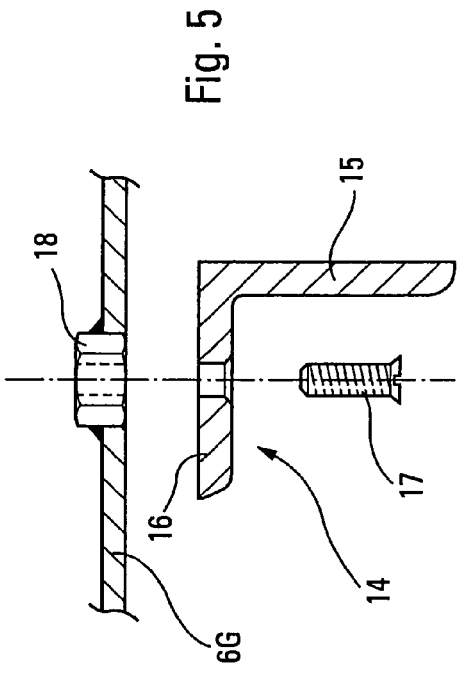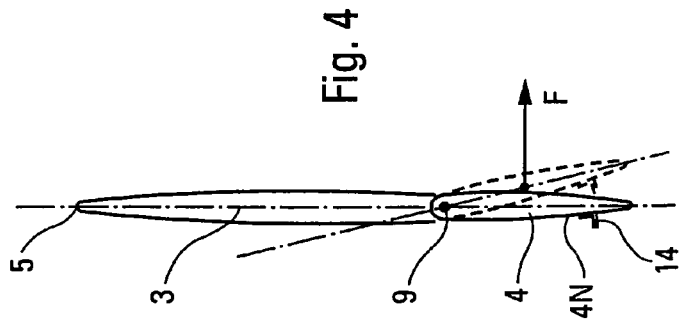

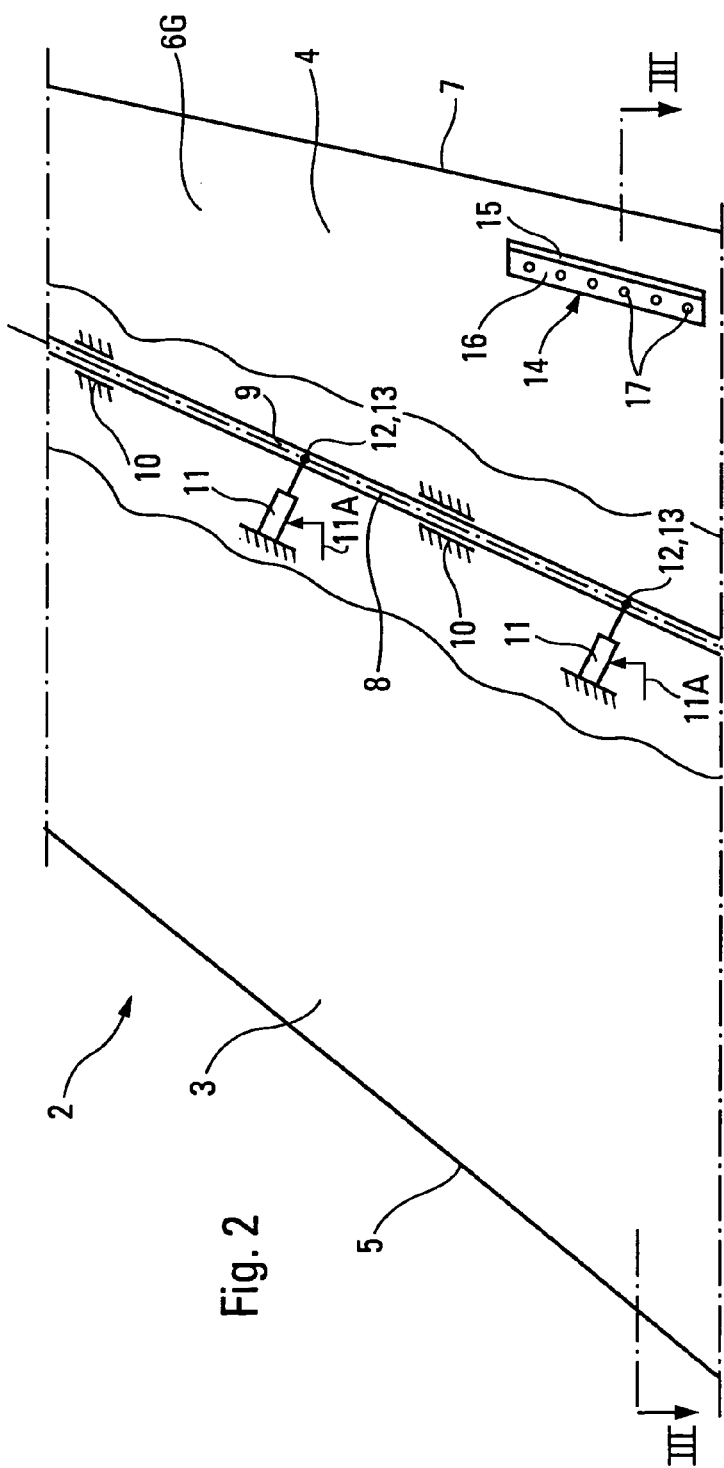
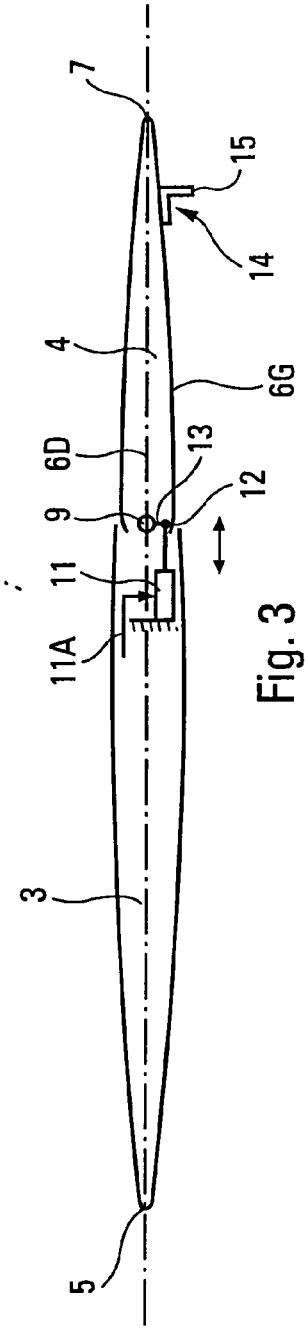

METHOD MAKING IT POSSIBLE TO PREVENT VIBRATION OF A RUDDER OF AN AIRCRAFT AND AIRCRAFT USING THIS METHOD

FIELD OF THE INVENTION

The present invention relates to a method making it possible to prevent vibration of a rudder of an aircraft flying without sideslip and to an aircraft implementing this method.

BACKGROUND OF THE RELATED ART

It is known that a rudder assembly of an aircraft comprises a fixed vertical stabilizer and a movable rudder. This rudder is connected to the fixed vertical stabilizer by articulation means which form an articulation axis and it can rotate about the latter when acted upon by actuating means, such as jacks. It is furthermore known that such a rudder comprises two lateral aerodynamic surfaces which meet at the rear end of the aircraft in order to form the trailing edge of the movable rudder, which is also that of the rudder assembly.

As the functioning of the said rudder progresses, wear phenomena increase the normal operational mechanical plays provided in the construction of the said articulation means and/or in the transmission means between the said actuating means and the said rudder.

In normal flight of the aircraft, that is to say with zero sideslip, the said rudder is positioned in the aerodynamic extension of the fixed vertical stabilizer, in alignment with the latter, and is subjected to practically no aerodynamic effects. However, because of increased plays due to wear, it can happen that, despite the virtual non-existence of aerodynamic forces applied to it, the rudder starts to vibrate under the effect of turbulence or normal instabilities of the aerodynamic airflow.

As the mechanical plays increase with the ageing of the said articulation means and of the said transmission means, the same applies to the amplitude of the vibration of the said rudder. Such vibration, even of large amplitude, is not prejudicial to the safety of the aircraft, but it generates irritation for the passengers, who feel vibration induced in the cabin, and piloting discomfort for the pilot or pilots.

When this vibration reaches an unacceptable amplitude with regard to the comfort of the passengers and the pilots, it is necessary to replace the wearing parts of the said articulation means and/or of the said transmission means, in order to return to the slight operational plays. Such a replacement operation is relatively complex and in practice it necessitates an immobilization of the aircraft, the duration of which is not generally compatible with that of stopovers.

It is of course possible to carry out preventive maintenance operations by replacing the said wearing parts before the amplitude of the vibration becomes a nuisance. Such preventive maintenance operations can be carried out during the aircraft's programmed maintenance periods but it then becomes routine to carry out interventions and replacements of parts which are not strictly necessary.

SUMMARY OF THE INVENTION

The purpose of the present invention is to overcome these disadvantages. It relates in particular to a method that is simple and quick to use making it possible to eliminate the vibration of a rudder in normal operation and to push back to a later date the need to replace the wearing parts, for example until a future and programmed maintenance operation, in order not to disrupt the operational use of the aircraft.

For this purpose, according to the invention, the method making it possible to prevent vibration of the rudder of an aircraft flying without sideslip, the said rudder being connected to a fixed vertical stabilizer by articulation means forming an articulation axis, being able to rotate about the said articulation axis under the action of controllable actuating means, and comprising two lateral aerodynamic surfaces meeting at the rear end of the aircraft in order to form a trailing edge, the said vibration resulting from excessive mechanical plays in the said articulation means or in transmission means connecting the said controllable actuating means and the said rudder, is noteworthy in that:

on one of the said lateral aerodynamic surfaces of the rudder, there is fixed a protruding aerodynamic element capable of generating an aerodynamic effect tending to rotate the said rudder about the said articulation axis; and the said actuating means are controlled such that they counter the action of the said protruding aerodynamic element and such that they impose on the said rudder a position of equilibrium in aerodynamic extension of the said fixed vertical stabilizer.

Thus, the said protruding aerodynamic element creates an asymmetry of the aerodynamic forces applied to the said rudder and generates a force tending to rotate the latter towards the side opposite that of the said aerodynamic element, about the said articulation axis. The actuating means (jacks) controlled by the pilot of the aircraft make it possible to deflect the rudder in the opposite direction in order to maintain it in a position of aerodynamic equilibrium, such that the aircraft is not subjected to any sideslip. Such a counteracting deflection of the rudder generates, at the level of the said articulation means and of the said transmission means, a lateral force which prevents the said rudder from vibrating in normal flight conditions.

It will be noted that the patent U.S. Pat. No. 1,457,507 provides, on surfaces subjected to aerodynamic forces, strips with adjustable inclination in order to adjust the dynamic characteristics of the said surfaces. In no case are such inclined strips provided for preventing vibration resulting from mechanical plays.

The said aerodynamic element provided by the present invention can have diverse shapes and dimensions which it is appropriate to adapt to the dimensions of the rudder and to the sought aerodynamic forces. The said protruding aerodynamic element can have an elongated shape and it can be disposed in a way that is at least approximately parallel with the trailing edge of the said rudder. For example, the said protruding aerodynamic element is a length of angle section fixed by one of its flanges to the said lateral aerodynamic surface, the other flange of the said length of angle section protruding with respect to the said lateral aerodynamic surface.

It is obviously advantageous to limit, as much as possible, the size of the said aerodynamic element in order to avoid negative effects on the drag and fuel consumption of the aircraft, without by so doing negating the sought effect. For this purpose, it is preferable that the said protruding aerodynamic element is fixed in the vicinity of the trailing edge of the said rudder. Thus, the aerodynamic force generated by the said aerodynamic element can benefit from a long lever arm in order to tend to rotate the said element about the articulation axis.

Tests have shown that, in these conditions, for a rudder having a span of 6 m, a length of angle section of length between 400 and 800 mm, with flanges having a height of 12 mm, gave satisfactory results as an aerodynamic element capable of preventing vibration of the said rudder.

Preferably, the said protruding aerodynamic element is fixed in a detachable manner onto the said rudder. Thus, the said aerodynamic element can be mounted temporarily on the said rudder when large mechanical plays appear in the articulation means and/or the transmission means and can be removed when the parts exhibiting these large plays have been replaced. For this purpose, the said protruding aerodynamic element can be fixed on the said lateral aerodynamic surface by means of complementary attachment elements some of which are fixed permanently on the said mobile rudder. These attachment elements advantageously comprise screws and nuts, the said nuts being incorporated in the said lateral aerodynamic surface with which they are preferably flush.

Moreover, the present invention also comprises an aircraft provided with a rudder assembly comprising a fixed vertical stabilizer and a mobile rudder, the said rudder
   being connected to the said fixed vertical stabilizer by articulation means which form an articulation axis,
   being able to rotate about the said articulation axis under the action of controllable actuating means, and
   comprising two lateral aerodynamic surfaces meeting at the rear end of the aircraft in order to form a trailing edge,
the said aircraft being noteworthy in that:
   it comprises a protruding aerodynamic element fixed onto one of the said lateral aerodynamic surfaces of the said rudder and capable of generating an aerodynamic effect tending to rotate the said rudder about the said articulation axis; and
   the said controllable actuating means imposing on the said rudder a position of equilibrium in aerodynamic extension of the said fixed vertical stabilizer.

BRIEF DESCRIPTION OF THE DRAWINGS

The figures of the appended drawing will give a good understanding of how the invention may be embodied. In these figures, identical references indicate similar elements.

FIG. 1 is a side view of a large-capacity civil aircraft.

FIG. 2 is a partial and diagrammatic side view, enlarged and with a tear-away, of the rudder assembly of the aircraft shown in FIG. 1.

FIG. 3 is a diagrammatic horizontal cross-section of the said rudder assembly through the lines III-III of FIGS. 1 and 2.

FIG. 4 is a diagrammatic illustration of the mode of action of the aerodynamic element according to the present invention.

FIG. 5 is a diagrammatic illustration of an example of fixing the said element on the rudder.

DETAILED DESCRIPTION OF THE INVENTION

The large-capacity civil aircraft 1, shown in FIG. 1, comprises, in the vicinity of its tail, a rudder assembly 2 comprising a fixed vertical stabilizer 3 and a mobile rudder 4.

At the forward end, the fixed vertical stabilizer 3 has a leading edge 5, constituting the leading edge of the said rudder assembly 2.

Moreover, the said mobile rudder 4 comprises two lateral aerodynamic surfaces 6G and 6D meeting at the rear end of the aircraft 1 in order to form the trailing edge 7 of the said rudder 4 and of the said rudder assembly 2.

The rudder 4 is mounted such that it rotates with respect to the fixed vertical stabilizer 3, about an articulation axis 8, defined by a shaft 9 integral with the rudder 4 and able to swivel in bearings 10, integral with the vertical stabilizer 3.

The shaft 9, and therefore the rudder 4, can be driven in rotation, in both directions, about the articulation axis 8 by jacks 11 mounted in the vertical stabilizer 3 and controlled by the pilot of the aircraft 1 by the intermediary of control lines 11A. In order to do this, the free ends of the rods of the jacks 11 are articulated, for example by means of swivels 12, on swivel pins 13 integral with the shaft 9.

When the aircraft 1 is flying without sideslip, the rudder 4 is in a position of equilibrium 4N in aerodynamic extension of the vertical stabilizer 3, as illustrated in FIGS. 3 and 4. However, if mechanical plays, resulting from wear, that are too large appear in the swivels 12 and/or the bearings 10, the rudder 4 can start vibrating about this position of equilibrium 4N.

When the effects of this vibration becomes unacceptable for the comfort of the passengers of the aircraft 1 and/or for the piloting of the aircraft 1, according to the invention, there is fixed on one of the lateral aerodynamic surfaces of the mobile rudder 4, for example the lateral aerodynamic surface 6G, an aerodynamic element 14 which protrudes with respect to the latter.

Because of this, there is created an asymmetry of the aerodynamic forces applied to the rudder 4, which therefore tends to pivot about the articulation axis 8 under the action of a transverse force F, generated by the aerodynamic element 14, as illustrated by the dotted line in FIG. 4.

In order to maintain the rudder 4 in the position of equilibrium 4N, the pilot is obliged to control the jacks 11 (by the lines 11A) in the direction of a counter-deflection of the said rudder 4. This results in a lateral force which, by acting on the articulation 9, 10 and on the swivels 12, prevents the said rudder 4 from vibrating.

In order that, with a small-sized aerodynamic element 14, the rotational couple applied by the force F is sufficiently high to necessitate a counteracting deflection of the rudder 4 capable of eliminating the vibration, the said aerodynamic element is disposed in the vicinity of the trailing edge 7.

This aerodynamic element 14 can be constituted by a length of angle section, of which one flange 15 is mounted substantially perpendicular to the aerodynamic surface 6G, whilst the other flange 16 of the said length of angle section is used for fixing the latter on the said aerodynamic surface 6G, for example by means of screws 17 cooperating with nuts 18 permanently incorporated in the said aerodynamic surface 6G (see FIG. 5).

It will be understood easily that, with such a fixing system, the aerodynamic element 14 can be mounted on the rudder 4 and can be removed from the latter. Thus, it can be fitted temporarily as long as the plays in the articulation 9, 10 and/or in the swivels 12 are excessive but can be removed as soon as these excessive plays have been eliminated and replaced by normal operational plays.

The invention claimed is:

1. A method for preventing vibration of a rudder of an aircraft flying without sideslip, said rudder being connected to a fixed vertical stabilizer by an articulation section that forms an articulation axis, being able to rotate about said articulation axis under the action of a controllable actuator, and comprising two lateral aerodynamic surfaces meeting at the rear end of the aircraft in order to form a trailing edge, said vibration resulting from mechanical plays in said articulation section or in a transmission section that connects said controllable actuator and said rudder, wherein said method comprises the steps of:

fixing a protruding aerodynamic element on one of said lateral aerodynamic surfaces of the rudder, said protruding aerodynamic element being capable of generating an aerodynamic effect tending to rotate said rudder about said articulation axis; and controlling said actuator for countering said aerodynamic effect of said protruding aerodynamic element for imposing on said rudder a position of equilibrium in aerodynamic extension of said fixed vertical stabilizer, wherein:

said control for imposing on said rudder the position of equilibrium prevents said rudder vibrations resulting from said mechanical plays, and said protruding aerodynamic element is fixed in a temporary manner onto said rudder when said mechanical plays are at a first level and is removed from said rudder when said mechanical plays are below said first level.

2. The method as claimed in claim 1, wherein said protruding aerodynamic element is fixed in the vicinity of the trailing edge of said rudder.

3. The method as claimed in claim 1, further comprising fixing said protruding aerodynamic element on said one of said lateral aerodynamic surfaces by complementary attachment elements some of which are fixed permanently on said mobile rudder.

4. The method as claimed in claim 1, further comprising using complementary attachment elements comprising screws and nuts and wherein one incorporates said nuts in said one of said lateral aerodynamic surfaces.

5. The method as claimed in claim 1, further comprising using a protruding aerodynamic element having an elongated shape and wherein one disposes it, on said one of said lateral aerodynamic surfaces, in a way that is at least approximately parallel with the trailing edge of said rudder.

6. The method as claimed in claim 4, further comprising using a protruding aerodynamic element which is a length of angle section fixed by one of its flanges to said one of said lateral aerodynamic surfaces, the other flange of said length of angle section protruding with respect to said one of said lateral aerodynamic surfaces.

* * * * *